US008059633B2

(12) United States Patent
Heidermark et al.

(10) Patent No.: US 8,059,633 B2
(45) Date of Patent: Nov. 15, 2011

(54) CALL FORWARDING IN AN IP MULTIMEDIA SUBSYSTEM (IMS)

(75) Inventors: Alf Heidermark, Saltsjöbaden (SE); Hans-Erik Van Elburg, Oosterhout (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 804 days.

(21) Appl. No.: 11/915,235

(22) PCT Filed: May 27, 2005

(86) PCT No.: PCT/EP2005/052439
§ 371 (c)(1),
(2), (4) Date: Jul. 2, 2008

(87) PCT Pub. No.: WO2006/125474
PCT Pub. Date: Nov. 30, 2006

(65) Prior Publication Data
US 2009/0067411 A1     Mar. 12, 2009

(51) Int. Cl.
*H04L 12/66* (2006.01)
(52) U.S. Cl. .................................................. 370/352
(58) Field of Classification Search .......... 370/328–339, 370/351–356, 389, 395.5–395.52, 465–466; 709/227–229
See application file for complete search history.

(56) References Cited

U.S. PATENT DOCUMENTS
7,529,839 B2 * 5/2009 Varga et al. ............ 709/227

FOREIGN PATENT DOCUMENTS
WO      WO 2004/086723 A    10/2004

OTHER PUBLICATIONS

ETSI TS 124 229 V5.12.0, Internet Protocol (IP) multimedia call control protocol based on Session Initiation Protocol (SIP) and Session Description Protocol (SDP), Stage 3 (3GPP TS 24.229 version 5.12.0 Release 5), 263 pages, 2005.*

* cited by examiner

*Primary Examiner* — Frank Duong (57) ABSTRACT

A method and Serving Call/State Control Function (S-CSCF) for handling a Session Initiation Protocol (SIP) communication within an IP Multimedia Subsystem (IMS), wherein the communication is subject to a call-forwarding operation handled by a SIP Application Server (AS). An INVITE is received at the S-CSCF, which serves a user equipment (UE) identified by an R-URI. The S-CSCF adds a URI for the S-CSCF to the INVITE route header together with an Original Dialog Identifier (ODI) mapped to the R-URI. The S-CSCF forwards the INVITE to the AS, which changes the R-URI to a URI of a UE to which the call is to be forwarded. The AS adds a forwarding indicator to the INVITE and returns it to the S-CSCF. The S-CSCF identifies the forwarding indicator and determines the original R-URI based on the ODI received in the returned INVITE. The S-CSCF determines call restrictions and Initial Filter Criteria (IFCs) based on the original R-URI.

9 Claims, 8 Drawing Sheets

```
INVITE sip:userf_public1@home2.net SIP/2.0
Via: SIP/2.0/UDP scscf1.home1.net;branch=z9hG4bK344a65.1, SIP/2.0/UDP
   pcscf1.visited1.net;branch=z9hG4bK240f34.1, SIP/2.0/UDP
   [5555::aaa:bbb:ccc:ddd]:1357;comp=sigcomp;branch=z9hG4bKnashds7
Max-Forwards: 68
Route: <sip:as1.home1.net;lr>,
   <sip:cb03a0s09a2sdfglkj490333@scscf1.home1.net;lr>
Record-Route: <sip:orig@scscf1.home1.net;lr>, <sip:pcscf1.visited1.net;lr>
P-Asserted-Identity: "John Doe" <sip:user1_public1@home1.net>, <tel:+1-212-555-
   1111>
P-Access-Network-Info:
P-Charging-Vector: icid-value="AyretyU0dm+602IrT5tAFrbHLso=023551024"; orig-
   ioi=home1.net
P-Charging-Function-Addresses: ccf=[5555::b99:c88:d77:e66];
   ccf=[5555::a55:b44:c33:d22]; ecf=[5555::1ff:2ee:3dd:4ee];
   ecf=[5555::6aa:7bb:8cc:9dd]
Privacy:
From:
To:
Call-ID:
Cseq:
Contact:
Allow:
Content-Type:
Content-Length: (...)

```
INVITE sip:usert_public1@home2.net SIP/2.0
Via: SIP/2.0/UDP as1.home1.net;branch=z9hG4bK240f34.1
Max-Forwards: 70
Route: <sip:cb03a0s09a2sdfglkj490333@scscf1.home1.net;lr; forw >
P-Asserted-Identity: "John Doe" <sip:user1_public1@home1.net>, <tel:+1-212-555-
    1111>
P-Charging-Vector: icid-value="AyretyU0dm+6O2IrT5tAFrbHLso=323551024"
Privacy:
From: <sip:user1_public1@home1.net>; tag=234567
To: <sip:user2_public1@home2.net>
Call-ID: s09a233cbsdfglkj490303a0
Cseq: 278 INVITE
Contact: <sip:[7777::eee:ddd:ccc:aaa]>
Allow: INVITE, ACK, CANCEL, BYE, PRACK, UPDATE, REFER, MESSAGE
Content-Type: application/sdp
Content-Length: (...)
History-Info: <sip:Userf_public@home2.netReason=SIP%3B \cause%3D302> index=1.1,
```

Figure 6

```
INVITE sip:userf_public1@home2.net SIP/2.0
Via: SIP/2.0/UDP scscf1.home1.net;branch=z9hG4bK344a65.1, SIP/2.0/UDP
    pcscf1.visited1.net;branch=z9hG4bK240f34.1, SIP/2.0/UDP
    [5555::aaa:bbb:ccc:ddd]:1357;comp=sigcomp;branch=z9hG4bKnashds7
Max-Forwards: 68
Route: <sip:as1.home1.net;lr>,
    <sip:cb03a0s09a2sdfglkj490333@scscf1.home1.net;lr>
Record-Route: <sip:orig@scscf1.home1.net;lr>, <sip:pcscf1.visited1.net;lr>
P-Asserted-Identity: "John Doe" <sip:user1_public1@home1.net>, <tel:+1-212-555-
    1111>
P-Access-Network-Info:
P-Charging-Vector: icid-value="AyretyU0dm+6O2IrT5tAFrbHLso=023551024"; orig-
    ioi=home1.net
P-Charging-Function-Addresses: ccf=[5555::b99:c88:d77:e66];
    ccf=[5555::a55:b44:c33:d22]; ecf=[5555::1ff:2ee:3dd:4ee];
    ecf=[5555::6aa:7bb:8cc:9dd]
Privacy:
From:
To:
Call-ID:
Cseq:
Contact:
Allow:
Content-Type:
Content-Length: (...)
```

Figure 7

```
INVITE sip:usert_public1@home2.net SIP/2.0
Via: SIP/2.0/UDP as1.home1.net;branch=z9hG4bK240f34.1
Max-Forwards: 70
Route: <sip:cb03a0s09a2sdfglkj490333@scscf1.home1.net;lr; >
P-Asserted-Identity: sip:userf_public1@home2.net
 P-Charging-Vector: icid-value="AyretyU0dm+6O2IrT5tAFrbHLso=323551024"
Privacy:
From: <sip:user1_public1@home1.net>; tag=234567
To: <sip:user2_public1@home2.net>
Call-ID: s09a233cbsdfglkj490303a0
Cseq: 278 INVITE
Contact: <sip:[7777::eee:ddd:ccc:aaa]>
Allow: INVITE, ACK, CANCEL, BYE, PRACK, UPDATE, REFER, MESSAGE
Content-Type: application/sdp
Content-Length: (...)
New Header: "John Doe" <sip:user1_public1@home1.net>, <tel:+1-212-555-1111>

History-Info: <sip:Userf_public@home2.netReason=SIP%3B \cause%3D302> index=1.1,
```

Figure 8

```
INVITE sip:userf_public1@home2.net SIP/2.0
Via: SIP/2.0/UDP scscf1.home1.net;branch=z9hG4bK344a65.1, SIP/2.0/UDP
    pcscf1.visited1.net;branch=z9hG4bK240f34.1, SIP/2.0/UDP
    [5555::aaa:bbb:ccc:ddd]:1357;comp=sigcomp;branch=z9hG4bKnashds7
Max-Forwards: 68
Route: <sip:as1.home1.net;lr>,
    <sip:cb03a0s09a2sdfglkj490333@scscf1.home1.net;lr>
Record-Route: <sip:orig@scscf1.home1.net;lr>, <sip:pcscf1.visited1.net;lr>
P-Asserted-Identity: "John Doe" <sip:user1_public1@home1.net>, <tel:+1-212-555-
    1111>
P-Access-Network-Info:
P-Charging-Vector: icid-value="AyretyU0dm+602IrT5tAFrbHLso=023551024"; orig-
    ioi=home1.net
P-Charging-Function-Addresses: ccf=[5555::b99:c88:d77:e66];
    ccf=[5555::a55:b44:c33:d22]; ecf=[5555::1ff:2ee:3dd:4ee];
    ecf=[5555::6aa:7bb:8cc:9dd]
Privacy:
From:
To:
Call-ID:
Cseq:
Contact:
Allow:
Content-Type:
Content-Length: (...)

```
INVITE sip:usert_public1@home2.net SIP/2.0
Via: SIP/2.0/UDP as1.home1.net;branch=z9hG4bK240f34.1
Max-Forwards: 70
Route: <sip:cb03a0s09a2sdfglkj490333@scscf1.home1.net;lr; forw2 >
P-Asserted-Identity: :"John Doe" <sip:user1_public1@home1.net>, <tel:+1-212-
    555-1111>.
P-Charging-Vector: icid-value="AyretyU0dm+6O2IrT5tAFrbHLso=323551024"
Privacy:
From: <sip:user1_public1@home1.net>; tag=234567
To: <sip:user2_public1@home2.net>
Call-ID: s09a233cbsdfglkj490303a0
Cseq: 278 INVITE
Contact: <sip:[7777::eee:ddd:ccc:aaa]>
Allow: INVITE, ACK, CANCEL, BYE, PRACK, UPDATE, REFER, MESSAGE
Content-Type: application/sdp
Content-Length: (...)
History-Info: <sip:Userf_public@home2.netReason=SIP%3B \cause%3D302> index=1.1,
```

Figure 10

CALL FORWARDING IN AN IP MULTIMEDIA SUBSYSTEM (IMS)

FIELD OF THE INVENTION

The present invention relates to call forwarding in an IP Multimedia Subsystem (IMS), and in particular to a method and apparatus for handling Session Initiation Protocol messages related to call forwarding at a Serving Call/Session Control Function within the IMS.

BACKGROUND TO THE INVENTION

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over mobile communication networks (3GPP TS 22.228, TS 23.218, TS 23.228, TS 24.228, TS 24.229, TS 29.228, TS 29.229, TS 29.328 and TS 29.329 Release 5 and Release 6). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

Figure 1:
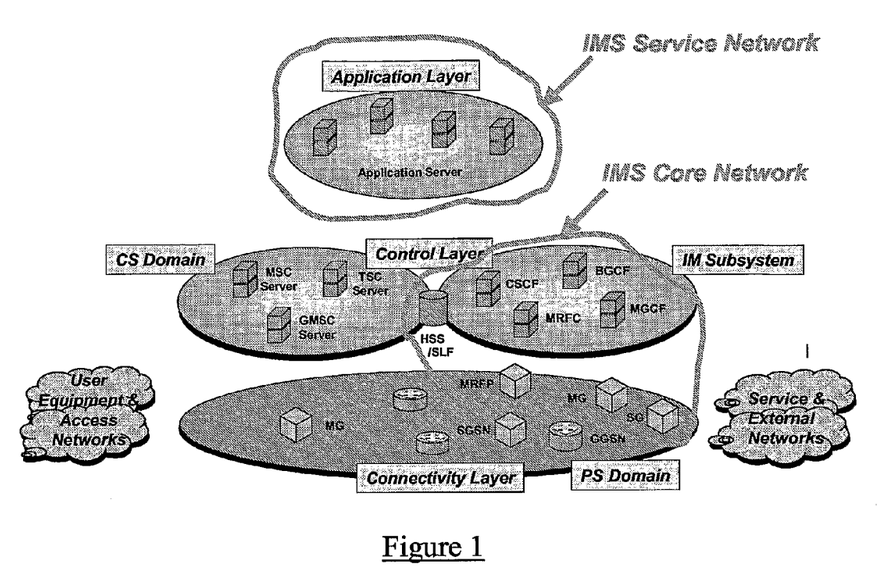
FIG. 1 illustrates schematically the integration of an IP Multimedia Subsystem into a 3G mobile communications system.

FIG. 1 illustrates schematically how the IMS fits into the mobile network architecture in the case of a GPRS/PS access network. Call/Session Control Functions (CSCFs) operate as SIP proxies with the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. The user receives a unique URI from the S-CSCF that it shall use when it initiates a dialog. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if a S-CSCF is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a user by the I-CSCF in the case where the user is called by another party, and the user is not currently allocated an S-CSCF.] When a registered user subsequently sends a session request (e.g. SIP INVITE) to the IMS, the request will include the P-CSCF and S-CSCF URIs so that the P-CSCF is able to forward the request to the selected S-CSCF. This applies both on the originating and terminating sides (of the IMS). [For the terminating call the request will include the P-CSCF address and the UE address.]

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. The IFCs are received by the S-CSCF from an HSS during the IMS registration procedure as part of a user's User Profile.

Figure 2:
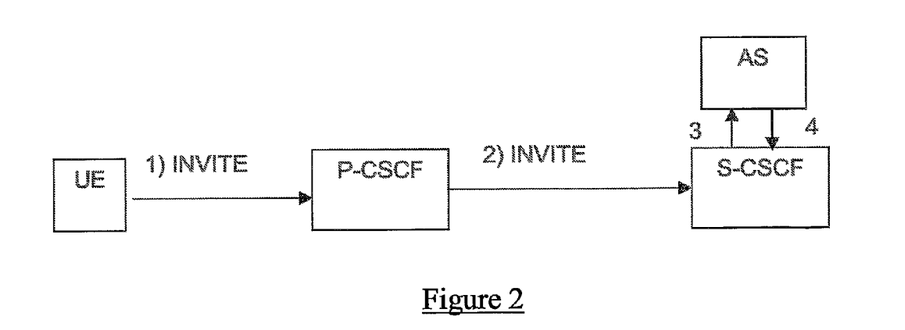
FIG. 2 illustrates the flow of a SIP INVITE on the originating call side of the IMS.

The working group know as ETSI TISPAN is developing the use of IMS for fixed broadband accesses. One of their tasks is to develop supplementary services based upon the IMS defined by 3GPP. These supplementary services will be defined in separate specifications although they will impact upon core specifications such as TS24.229. FIG. 2 illustrates schematically the message flow within the IMS for a SIP INVITE, on the call originating side, according to TS24.229 (chapter 5.4.3.2). At step 1), the INVITE is sent from the originating User Equipment (UE) to the P-CSCF. This INVITE includes in its header a so-called P-Preferred identity, as well as including the URI of the P-CSCF at the topmost level of the SIP route header and the URI of the S-CSCF as the second entry. The UE also includes the identity of the communicating partner in the Request-URI. Upon receipt of the INVITE, the P-CSCF checks that the originating UE is allowed to use the identity included as the P-Preferred identity, and if so includes it as the P-Asserted Identity in the outgoing INVITE. The P-Asserted Identity is an identity that is used among trusted SIP entities, typically intermediaries, to carry the identity of the user sending a SIP message as it was verified by authentication. The P-CSCF identifies the S-CSCF allocated to the originating UE by looking in the Route Header, and at step 2) forwards the amended INVITE to that S-CSCF.

The S-CSCF handles the call according to an originating call procedure. The S-CSCF uses the P-Asserted Identity to check whether any relevant restrictions have been placed on the originating UE, e.g. is the UE barred from using the requested service. The S-CSCF also uses the P-Asserted Identity to determine the IFCs for the UE. In the example of FIG. 2, it is assumed that the IFCs require that the S-CSCF forward (step 3)) the INVITE to a particular AS. The S-CSCF includes at the topmost level of the SIP route header the URI of the AS. It also includes in the subsequent level its own URI, together with an Original Dialog Identifier (ODI). The ODI is generated by the S-CSCF and uniquely identifies the call to the S-CSCF. When the AS returns the INVITE (step 4)) to the S-CSCF, the AS strips the URI of the AS from the route header, leaving the URI of the S-CSCF together with the ODI tag. The ODI tag allows the S-CSCF to determine that the INVITE relates to an earlier dialogue.

It is possible for the AS logic to require the setting up of a new session. In this case, the identity of the origin, i.e. the P-Asserted Identity of the INVITE at step 4), can be either the identity of the originating UE, the identity of the AS, or an identity of a third party on whose behalf the AS is setting up the new session. In this case, the S-CSCF will repeat the call restriction check and determine the IFCs based upon the P-Asserted Identity contained in the "new" INVITE. Assuming that no further ASs are to be linked-in based upon the IFCs, the S-CSCF forwards the INVITE to the Request URI (R-URI) contained in the INVITE. This may be the R-URI contained in the original INVITE, or a new R-URI contained in the new INVITE if that is different.

Figure 3:
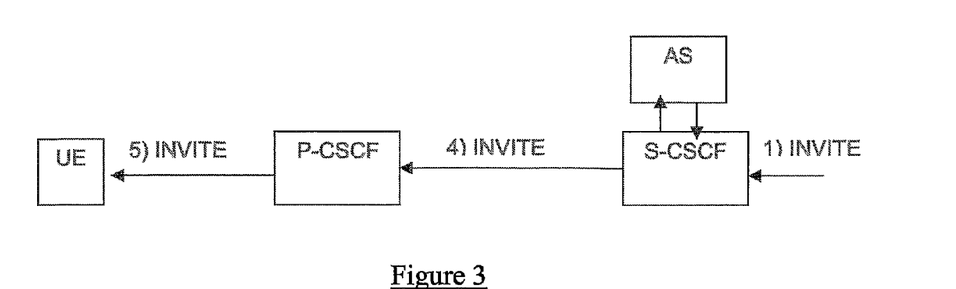
FIG. 3 illustrates the flow of a SIP INVITE on the terminating call side of the IMS.

FIG. 3 illustrates schematically the message flow within the IMS for a SIP INVITE, on the call terminating side (TS24.229: chapter 5.4.3.3). At step 1), the INVITE arrives from the I-SCSF (not shown) including the R-URI indicating the called party. The S-CSCF uses this R-URI to check for restrictions placed on the called party, and to obtain the IFCs. In this case, the IFCs do not indicate that an AS needs to be contacted. The S-CSCF will acquire the preloaded Route Headers for the called party, based on the R-URI, and send the INVITE forward to be UE based on these Route Header entries. The INVITE is received by the P-CSCF in accordance with the preloaded route in the S-CSCF, and the P-CSCF sends the INVITE to the UE in accordance with the contact header.

Figure 4:
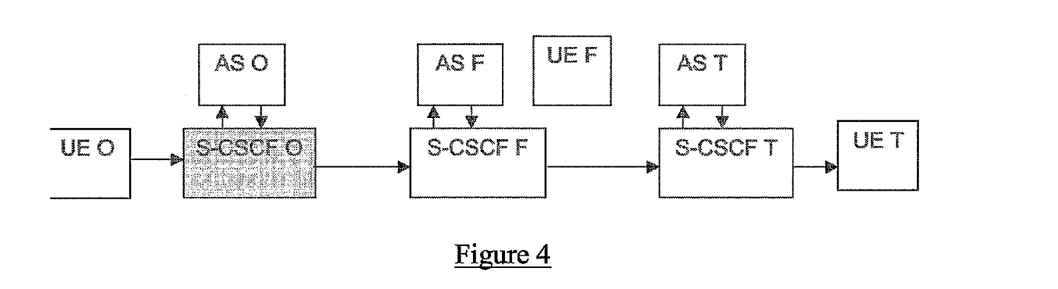
FIG. 4 illustrates the flow of a SIP INVITE in a call forwarding scenario within the IMS.

FIG. 4 illustrates an alternative INVITE message flow scenario, where a call from an originating terminal (UE-O) to a peer terminal (UE-F) is forwarded to a terminating terminal (UE-T). The call forwarding action is performed by an Application Server (AS-F). The call flow is as follows:

1) The INVITE is sent from UE-O addressed to UE-F (R-URI). The S-CSCF O performs the originating side call procedure as described with reference to FIG. 2.
2) After interaction with the AS-O ( no change is made to the R-URI at this stage) the S-CSCF O sends the INVITE to the I-CSCF (not shown) of UE-F's home network. The I-CSCF will acquire the address of the S-CSCF where the UE-F is registered from the HSS. The INVITE is sent to that S-CSCF, i.e. to S-CSCF F. The S-CSCF F will check the restriction requirement and obtain the IFCs as described above (for the terminating side case) with reference to FIG. 3, i.e. based on the R-URI contained in the INVITE. In the scenario illustrated in FIG. 4, the INVITE will be sent to the AS-F where the call forwarding is activated.
3) The AS-F will change the R-URI in the INVITE header from that of UE-F to that of UE-T. The modified INVITE will be returned to the S-CSCF F.
4) The S-CSCF F will send the INVITE to the I-CSCF of the UE-T network, and the I-CSCF (not shown) will interrogate the HSS to get the address of the S-CSCF T of UE-T, and forward the INVITE to the S-CSCF T.
5) The S-CSCF T will perform the terminating procedure as described with reference to FIG. 3, on the basis of the R-URI contained in the INVITE (that is the R-URI of UE-T).

SUMMARY OF THE INVENTION

Referring again to FIG. 4, at step 4l ), it will additionally be necessary for the S-CSCF F to check whether there are any restrictions on the forwarding terminal UE-F. To do this, the S-CSCF should use the originating side procedure of FIG. 2.

However, in the absence of any special procedures implemented by the AS-F, the INVITE returned to the S-CSCF F by the AS-F will include in the P-Asserted Identity field the identity of the UE-O. If the S-CSCF F were to perform an originating side check on the INVITE using the P-Asserted Identity, the S-CSCF F will be unable to locate a record for this identity as it does not "belong" to the S-CSCF F (rather it belongs to the S-CSCF O). On the other hand, if the S-CSCF performs a terminating side check on the INVITE, the check will also as the R-URI contained in the INVITE identifies the UE-T, and that R-URI belongs to the S-CSCF T rather than to the S-CSCF F. This problem arises with messages other than INVITE, including, for example, other initial request messages and standalone messages.

A solution to this problem might be for the AS-F to replace the P-Asserted Identity of UE-O with that of UE-F. However, this is unlikely to be accepted by operators who will prefer to leave the P-Asserted Identity unchanged from end-to-end. From the operators' point of view, the P-Asserted Identity field is akin to the traditional (PSTN) calling line identity. Other solutions to this problem must therefore be sought.

According to a first aspect of the present invention there is provided a method of handling a Session Initiation Protocol communication within an IP Multimedia Subsystem, where the communication is subject to a call forwarding operation handled by a Session Initiation Protocol Application Server, the method comprising:

receiving a Session Initiation Protocol message at a Serving Call/State Control Function serving a user equipment identified by a R-URI of the MESSAGE;

at the Serving Call/State Control Function, adding a URI of the Serving Call/State Control Function to the message route header together with an Original Dialog Identifier, and maintaining at the Serving Call/State Control Function a mapping between the Original Dialog Identifier and said R-URI;

forwarding the message to said Application Server;

at the Application Server, changing the R-URI in the message to a URI of a user equipment to which the call is to be forwarded, adding a forwarding indicator to the message, and returning the message to the Serving Call/State Control Function; and at the Serving Call/State Control Function, identifying the presence of said forwarding indicator, and in response identifying the original R-URI on the basis of the Original Dialog Identifier contained in the returned message, and processing the message according to the originating procedure using the original R-URI.

Said step of processing preferably comprises determining whether any restrictions are placed on the user equipment identified by the original R-URI, and identifying IFCs for this user equipment and carrying out further processing steps as defined by the IFCs.

Preferably, said forwarding indicator is contained in the route header.

Preferably, the P-Asserted Identity is the same in both the message received at the S-CSCF and the message returned from the Application server, this identity identifying the originating user equipment.

According to a second aspect of the present invention there is provided a Session Initiation Protocol Application Server of an IP Multimedia Subsystem having processing means for implementing a call forwarding operation by modifying a received message to include a forwarding indicator and a R-URI identifying the USER Equipment to which the call is to be forwarded.

According to a third aspect of the present invention there is provided a Serving Call/State Control Function of an IP Multimedia Subsystem and having processing means for processing a message received from a Session Initiation Protocol Application Server, the processing means being operable to determine whether or not the route header contains a forwarding indicator added by the Session Initiation Protocol Application Server and, if so, for identifying an original R-URI on the basis of an Original Dialogue Identifier contained in the received message, and for processing the message according to the originating procedure in dependence upon the original R-URI.

According to a fourth aspect of the invention there is provided a method of handling a Session Initiation Protocol communication within an IP Multimedia Subsystem, where the communication is subject to a call forwarding operation handled by a Session Initiation Protocol Application Server, the method comprising:

receiving a Session Initiation Protocol message at a Serving Call/State Control Function serving a user equipment identified by a R-URI of the message;

forwarding the message to said Application Server;

at the Application Server, changing the P-Asserted Identity of the message to said R-URI, and returning the message to the Serving Call/State Control Function; and at the Serving Call/State Control Function, processing the message according to the originating procedure using the R-URI contained in the P-Asserted Identity field.

According to a fifth aspect of the invention there is provided a method of handling a Session Initiation Protocol communication within an IP Multimedia Subsystem, where the communication is subject to a call forwarding operation handled by a Session Initiation Protocol Application Server, the method comprising:

receiving a Session Initiation Protocol message at a Serving Call/State Control Function serving a user equipment identified by a R-URI of the message;

forwarding the message to said Application Server;

at the Application Server, adding a forwarding indicator to the message and adding a History Information header, the History Information header including the SIP URI of the forwarding User Equipment as the topmost entry of the History Information header;

forwarding the message to said Serving Call/State Control Function; and at the Serving Call/State Control Function, identifying the presence of said forwarding indicator in the message, and processing the message according to the originating procedure using the URI contained in the History Information header.

According to a sixth aspect of the invention there is provided a method of handling a Session Initiation Protocol communication within an IP Multimedia Subsystem, where the communication is subject to a call forwarding operation handled by a Session Initiation Protocol Application Server, the method comprising:

receiving a Session Initiation Protocol message at a Serving Call/State Control Function serving a user equipment identified by a R-URI of the message;

at the Serving Call/State Control Function, storing said R-URI;

forwarding the message to said Application Server;

at the Application Server, changing the R-URI in the message to a URI of a user equipment to which the call is to be forwarded; and at the Serving Call/State Control Function, identifying a change in the R-URI of the message, and in response processing the message according to the originating procedure using the original R-URI.

The invention is applicable in particular to Session Initiation Protocol initial request messages, e.g. INVITE, and to standalone Session Initiation Protocol messages, e.g. messages relating to presence services.

Other aspects of the invention relate to Application Servers and Serving Call/State Control Function having processing means for implementing the fourth and fifth aspects of the invention.

DETAILED DESCRIPTION OF CERTAIN EMBODIMENTS

The problem of allowing a "forwarding" S-CSCF to perform a restriction check on an INVITE message has been considered above. It is necessary to provide a mechanism that identifies to the forwarding S-CSCF that an INVITE received from an Application Server needs to be treated in a different way from INVITEs received from a P-CSCF or other CSCF.

Four alternative solutions are proposed here.

Solution 1

Figure 5:
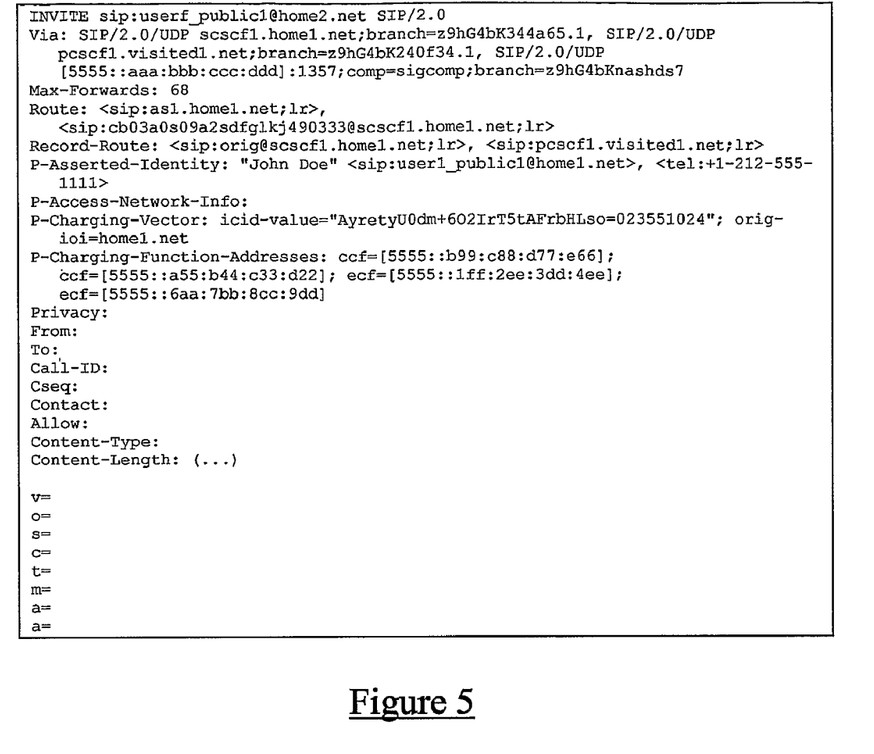
FIGS. 5 to 10 show example SIP INVITE message structures.

The INVITE arriving at the S-CSCF includes include in its header the R-URI pointing to one of the S-CSCF F's registered user, UE-F, i.e. userf_public11 @home2.net. It also includes the P-Asserted Identity of UE-O, i.e. "John Doe" <sip:user1_public1@home1.net>, <tel:+1-212-555-1111>. The S-CSCF F will send the initial request or standalone transaction to the AS (in response to the IFCs obtained for UE-F), adding the SIP URI of the AS as the topmost URI of the route header, i.e. sip:as1.home1.net;lr. In addition, the S-CSCF F includes its own SIP URI beneath the AS URI in the route header together with the "original dialog identifier" (ODI). At the same time, the S-CSCF F will bind the R-URI of the received INVITE to the ODI and store this binding in a local database. The structure of the INVITE sent from the S-CSCF to the AS-F is shown in FIG. 5, where the URI of the S-CSCF F added to the route header is "scscf1.home1.net;lr" and the ODI is "cb03a0s09a2sdfglkj490333".

Figure 6:
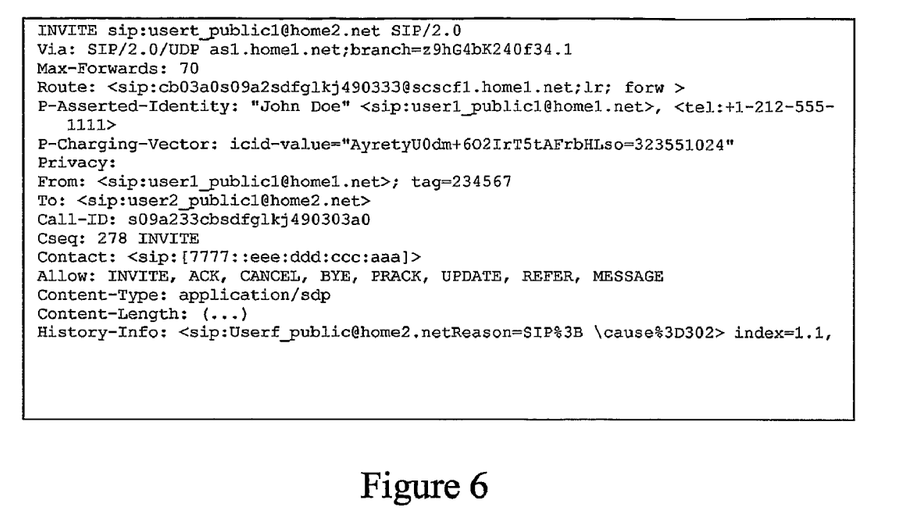

The structure of the INVITE returned from the AS-F to the S-CSCF F is shown in FIG. 6. The AS-F includes the information received in the incoming INVITE. In particular, the P-Asserted Identity is unchanged in order to satisfy operator requirements. However, it will add a new R-URI "usert_public1@home2.net" corresponding to the URI of the UE to which the call is to be forwarded, UE-T, and will add the History Information header as defined in the History Information header extension and will indicate to the S-CSCF F that a new call handling procedure should be used, namely a forwarding procedure. This is indicated by the inclusion of a "forw" parameter in the route header.

When the S-CSCF F receives such a modified message from the AS-F, based upon the inclusion of the "forw" parameter, the S-CSCF knows that the call comes from an AS and determines the ODI tagged to the S-CSCF F's own URI. Using the ODI, the S-CSCF determines from the local database the R-URI bound to this ODI, i.e. the URI of the forwarding terminal UE-F. The S-CSCF F will then perform the restriction check and IFC identification on the basis of the original R-URI (i.e. of UE-F) and not the URI of UE-T. [After all interactions between the S-CSCF F and the AS have been carried out, actions 9 to 15 in the paragraph that starts the sub clause 5.4.3.2 in TS24.229 are performed.]

Solution 2

Figure 7:
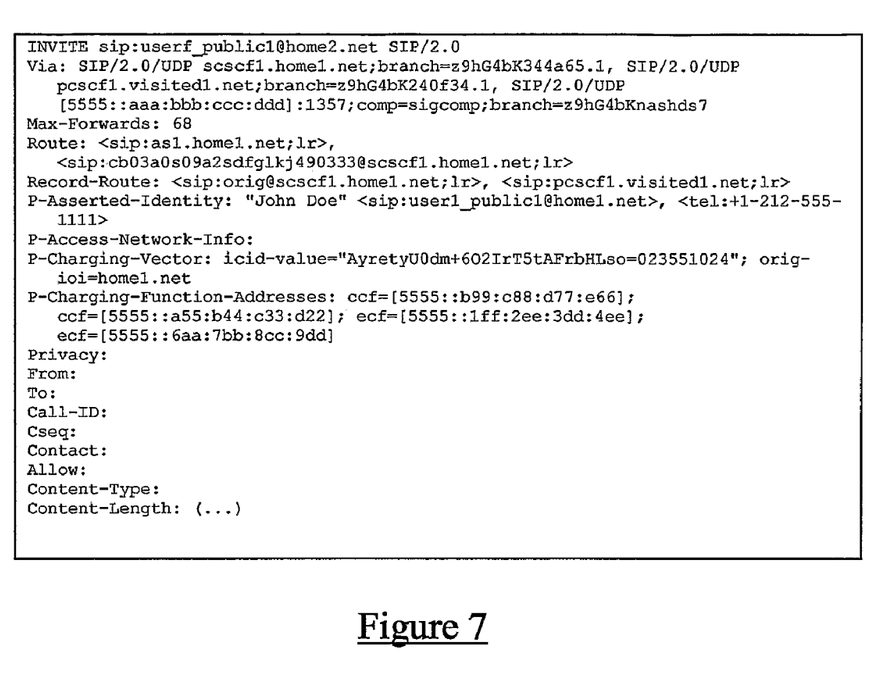

When the S-CSCF F sends the initial request to the AS it will maintain the P-Asserted Identity of the UE-O in the INVITE as described in the current standard. The S-CSCF F will add the SIP URI of the AS as the topmost URI of the route header, as well as its own SIP URI beneath the AS URI. The structure of the INVITE sent from the S-CSCF to the AS-F is shown in FIG. 7.

Figure 8:
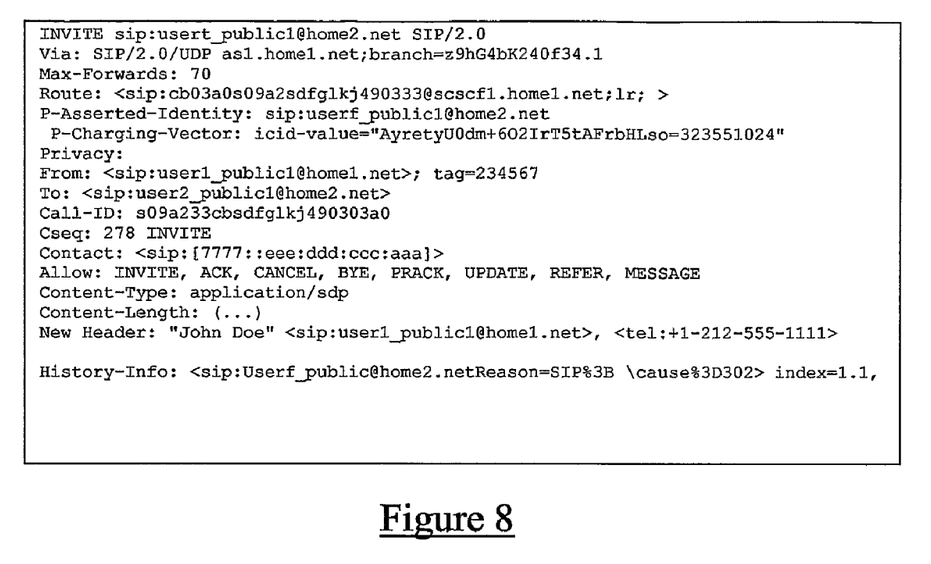

Following receipt of the INVITE by the AS-F, and when the AS-F determines that call forwarding is to be performed, as well as changing the R-URI to that of UE-T, it will replace the P-Asserted Identity of the original caller with the R-URI of the original message, i.e. the URI of UE-F. In addition, the AS-F will add the "orig" parameter in the route header to indicate that the INVITE is to be dealt with using the originating call type procedure. The AS-F will also include the received P-Asserted Identity (of UE-O) in a new header field of the message. The modified INVITE is returned to the S-CSCF F, and is shown in FIG. 8.

Upon receipt of the modified INVITE, the S-CSCF F will recognise from the message header that the INVITE is to be dealt with using the originating call type procedure, i.e. it will carry out the restriction check and determine the appropriate IFCs on the basis of the P-Asserted Identity which will include R-URI of UE-F. As S-CFCS F is the "owner" of this URI, the check will be performed successfully.

Prior to forwarding the INVITE to the I-CSCF associated with UE-T, the S-CSCF F will recognise that the INVITE must be modified again to replace the R-URI of UE-F with the P-Asserted Identity of UE-O (from the information received in the new header). As this identity is still within the message header, it is readily available to the S-CSCF F. This action is triggered due to the presence in the message of the "new header".

Solution 3

Yet another solution is to allow the S-CSCF to make use of the information contained in the History Information header.

Figure 9:
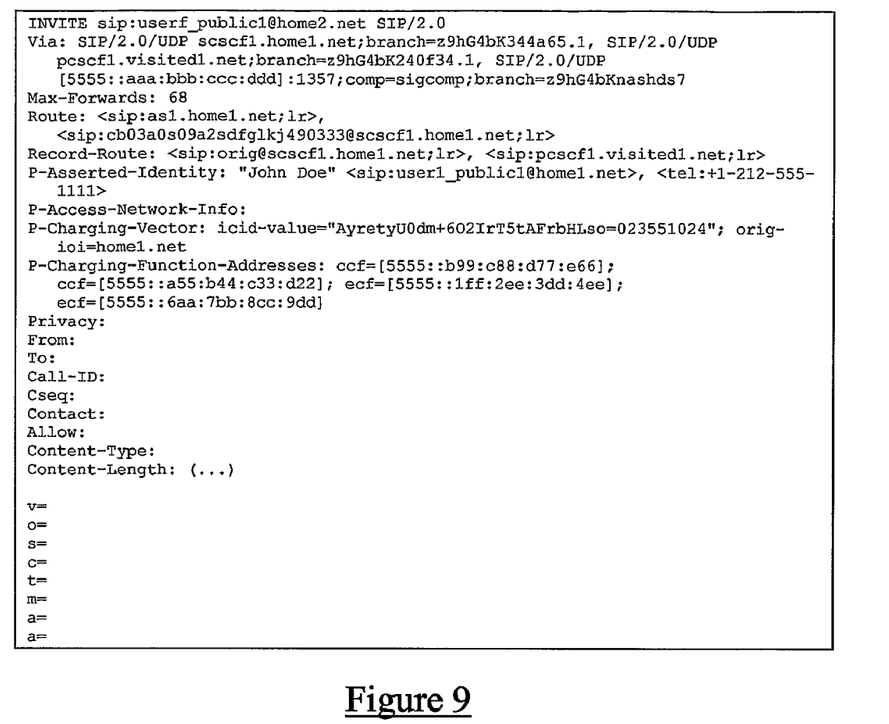
Figure 10:
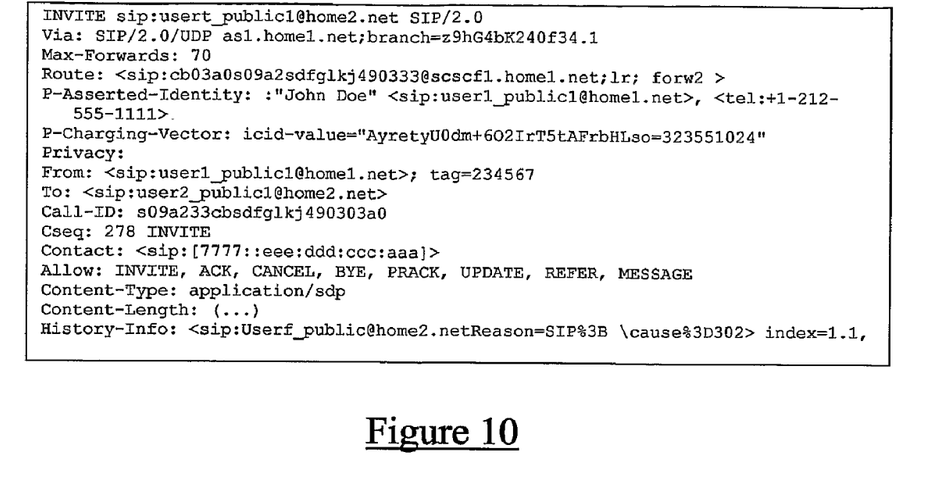

When the S-CSCF F sends the initial request to the AS it will maintain the P-Asserted Identity of the UE-O in the INVITE as described in the current standard. The S-CSCF F will add the SIP URI of the AS as the topmost URI of the route header, as well as its own SIP URI beneath the AS URI. The structure of the INVITE sent from the S-CSCF to the AS-F is shown in FIG. 9. Following receipt of the INVITE by the AS-F, and when the AS-F determines that call forwarding is to be performed, as well as changing the R-URI of the INVITE to that of UE-T, it will add the History Info header. It will include UE-F's SIP URI as the topmost entry of the History Information header. The AS will indicate to the S-CSCF F that a new call handling procedure should be used, namely a forwarding procedure. This is indicated by the inclusion of a "forw" parameter in the route header.

When the S-CSCF F receives such a modified INVITE from the AS-F, based upon the inclusion of the "forw" parameter the S-CSCF F knows that the call comes from an AS. The S-CSCF F will then perform the restriction check and IFC identification on the basis of the topmost header in History Info header, i.e. the URI of UE-F.

Solution 4

This solution involves storing the R-URI contained in the INVITE received at the S-CSCF F (from the I-CSCF). This may be mapped against the ODI. The AS changes the R-URI in the INVITE to that of the UE to which the INVITE is to be forwarded, i.e. UE-T. The S-CSCF F performs an initial check on the R-URI of the INVITE received from the AS to see if it has changed. If it has changed, then the restriction check and IFC determination is carried out based on the original R-URI (i.e. of UE-F).

It will be appreciated by the person of skill in the art that various modifications may be made to the embodiments described above without departing from the scope of the present invention.

The invention claimed is:

1. A method of handling a Session Initiation Protocol (SIP) communication within an IP Multimedia Subsystem, where the communication is subject to a call forwarding operation handled by a SIP Application Server, the method comprising the steps of:

receiving a (SIP) message from a first user equipment at a Serving Call/State Control Function serving a second user equipment that is identified by a Request-Universal Resource Identifier (R-URI) of the SIP message;

at the Serving Call/State Control Function, adding a URI of the Serving Call/State Control Function to a message route header of the SIP message together with an Original Dialog Identifier, and maintaining at the Serving Call/State Control Function a mapping between the Original Dialog Identifier and said R-URI;

forwarding the SIP message to the SIP Application Server;

at the SIP Application Server, changing the R-URI of the second user equipment in the SIP message to an R-URI of a third user equipment to which the communication is to be forwarded, adding a forwarding indicator to the SIP message, adding a History Information header to the SIP message including a SIP URI of the second user equipment, and returning the SIP message to the Serving Call/State Control Function; and at the Serving Call/State Control Function, identifying the presence of said forwarding indicator and responsively identifying the R-URI of the second user equipment on the basis of the Original Dialog Identifier contained in the returned SIP message, and processing the SIP message according to an originating procedure using the R-URI of the second user equipment.

2. The method according to claim 1, wherein said step of processing the SIP message according to the originating procedure comprises determining whether any restrictions are placed on the second user equipment identified by the original R-URI, and identifying initial filter criteria (IFCs) for the second user equipment and carrying out further processing steps as defined by the IFCs.

3. The method according to claim 1, wherein said forwarding indicator is added to the message route header of the SIP message received at the SIP Application Server.

4. The method according to claim 1, wherein a P-Asserted Identity is the same in both the SIP message received at the S-CSCF and the SIP message returned from the SIP Application Server, this identity identifying the first user equipment.

5. The method according to claim 1, wherein said SIP message is a standalone message.

6. The method according to claim 1, wherein said SIP message is an INVITE message.

7. A method of handling a Session Initiation Protocol (SIP) communication within an IP Multimedia Subsystem, where the communication is subject to a call forwarding operation handled by a SIP Application Server, the method comprising the steps of:

receiving a SIP message from a first user equipment at a Serving Call/State Control Function serving a second user equipment that is identified by a Request-Universal Resource Identifier (R URI) of the SIP message;

forwarding the message to the SIP Application Server;

at the SIP Application Server, changing the R-URI of the second user equipment in the SIP message to an R-URI of a third user equipment to which the communication is to be forwarded, adding a forwarding indicator to the SIP message and adding a History Information header, the History Information header including a SIP URI of the second User Equipment as the topmost entry of the History Information header;

forwarding the SIP message from the SIP Application Server to said Serving Call/State Control Function; and at the Serving Call/State Control Function, identifying the presence of said forwarding indicator in the SIP message, and processing the SIP message according to an originating procedure using the URI contained in the History Information header.

8. The method according to claim 7, wherein said forwarding indicator is added to a route header of the SIP message.

9. The method according to claim 7, wherein said step of processing the SIP message received at the Serving Call/State Control Function comprises determining whether any restrictions are placed on the second user equipment identified by the original R-URI, and identifying initial filter criteria (IFCs) for the second user equipment and carrying out further processing steps as defined by the IFCs.

* * * * *

UNITED STATES PATENT AND TRADEMARK OFFICE
CERTIFICATE OF CORRECTION

| | | |
|---|---|---|
| PATENT NO. | : 8,059,633 B2 | Page 1 of 1 |
| APPLICATION NO. | : 11/915235 | |
| DATED | : November 15, 2011 | |
| INVENTOR(S) | : Heidermark et al. | |

It is certified that error appears in the above-identified patent and that said Letters Patent is hereby corrected as shown below:

In Column 2, Line 28, delete "know" and insert -- known --, therefor.

In Column 3, Line 19, delete "I-SCSF" and insert -- I-CSCF --, therefor.

In Column 3, Line 64, delete "4l )," and insert -- 4 ), --, therefor.

In Column 6, Line 20, delete "IMS; and" and insert -- IMS; --, therefor.

In Column 6, Line 22, delete "IMS." and insert -- IMS; and --, therefor.

In Column 6, Line 39, delete "userf_public1l@" and insert -- userf_public1@ --, therefor.

In Column 7, Line 36, delete "S-CFCS" and insert -- S-CSCF --, therefor.

In Column 9, Line 9, in Claim 7, delete "(R URI)" and insert -- (R-URI) --, therefor.

Signed and Sealed this
Twentieth Day of March, 2012

David J. Kappos
*Director of the United States Patent and Trademark Office*